(12) United States Patent
Davis et al.

(10) Patent No.: US 10,588,172 B2
(45) Date of Patent: Mar. 10, 2020

(54) METHOD OF OPERATION IN A DUAL CARRIER COMMUNICATION SYSTEM

(75) Inventors: Simon Paul Davis, Romsey (GB); Kenneth Isaacs, Salisbury (GB)

(73) Assignee: HMD Global Oy, Espoo (FI)

( * ) Notice: Subject to any disclaimer, the term of this patent is extended or adjusted under 35 U.S.C. 154(b) by 584 days.

(21) Appl. No.: 12/226,184

(22) PCT Filed: Mar. 29, 2007

(86) PCT No.: PCT/GB2007/050166
§ 371 (c)(1),
(2), (4) Date: Apr. 28, 2009

(87) PCT Pub. No.: WO2007/116227
PCT Pub. Date: Oct. 18, 2007

(65) Prior Publication Data
US 2009/0219871 A1 Sep. 3, 2009

(30) Foreign Application Priority Data

Apr. 12, 2006 (GB) .................................. 0607359.7

(51) Int. Cl.
*H04W 76/36* (2018.01)
*H04W 36/28* (2009.01)
*H04W 36/00* (2009.01)

(52) U.S. Cl.
CPC ....... *H04W 76/36* (2018.02); *H04W 36/0009* (2018.08); *H04W 36/28* (2013.01)

(58) Field of Classification Search
CPC ... H04W 36/0005–0016; H04W 36/04; H04W 36/08; H04W 36/16–18; H04W 36/24; H04W 36/30; H04W 36/34–385

USPC .... 370/331, 328, 351, 320, 395.21, 32, 334, 370/339, 229, 436; 455/440, 436, 434, 455/446, 437, 432.1, 67.11, 444, 443, 455/518, 512, 520, 525, 519, 442, 450, 455/343.1

See application file for complete search history.

(56) References Cited

U.S. PATENT DOCUMENTS 5,970,417 A * 10/1999 Toyryla et al. ............... 455/519
6,119,007 A *  9/2000 Chater-Lea .................. 455/442
(Continued)

FOREIGN PATENT DOCUMENTS

CN    1338190 A    2/2002
CN    1735273 A    2/2006
(Continued)

OTHER PUBLICATIONS

"GERAN Evolution: Proposed Text on Dual-Carrier and Multi-carrier for Technical Report", 3 GPP TSG GERAN #25, Tdoc GP-051510, Jun. 2005, 5 pp.
(Continued)

*Primary Examiner* — Eric Myers
(74) *Attorney, Agent, or Firm* — Brake Hughes Bellermann LLP

(57) ABSTRACT

A mobile device in a dual carrier communication system communicates with a network via first and second carriers by receiving data in the first cell via one of the first and second carriers on one carrier frequency, whilst receiving system information and/or downlink data from a second cell via the other of the first and second carriers on another carrier frequency.

9 Claims, 4 Drawing Sheets

(56) References Cited

U.S. PATENT DOCUMENTS

| | | | |
|---|---|---|---|
| 6,377,803 B1* | 4/2002 | Ruohonen | 455/434 |
| 6,725,052 B1* | 4/2004 | Raith | 455/518 |
| 2002/0082019 A1* | 6/2002 | Sunay | H04W 36/30 455/442 |
| 2004/0028015 A1* | 2/2004 | Fouilland et al. | 370/337 |
| 2004/0106412 A1* | 6/2004 | Laroia et al. | 455/448 |
| 2004/0246923 A1* | 12/2004 | Achard | 370/331 |
| 2005/0090278 A1* | 4/2005 | Jeong et al. | 455/525 |
| 2005/0207396 A1* | 9/2005 | Vaittinen et al. | 370/352 |
| 2005/0208943 A1* | 9/2005 | Pecen et al. | 455/436 |
| 2006/0008065 A1* | 1/2006 | Longman | H04W 4/06 379/158 |
| 2006/0029066 A1* | 2/2006 | Jeong et al. | 370/389 |
| 2006/0035640 A1 | 2/2006 | Karaoguz et al. | |
| 2006/0056347 A1* | 3/2006 | Kwak et al. | 370/329 |
| 2006/0068792 A1* | 3/2006 | Vasudevan et al. | 455/444 |
| 2006/0072516 A1* | 4/2006 | Jeong et al. | 370/335 |
| 2006/0146744 A1* | 7/2006 | Vasudevan et al. | 370/328 |
| 2006/0165027 A1* | 7/2006 | Heden | 370/328 |
| 2006/0171359 A1* | 8/2006 | Schwarz | 370/331 |
| 2006/0251019 A1* | 11/2006 | Dalsgaard et al. | 370/331 |
| 2006/0258386 A1* | 11/2006 | Jeong et al. | 455/525 |
| 2007/0010252 A1* | 1/2007 | Balachandran et al. | 455/437 |
| 2007/0070949 A1* | 3/2007 | Hwang et al. | 370/331 |
| 2007/0191020 A1* | 8/2007 | Fischer et al. | 455/452.2 |
| 2007/0218929 A1* | 9/2007 | Kuo | 455/466 |
| 2007/0225001 A1* | 9/2007 | Heino et al. | 455/446 |
| 2008/0096567 A1* | 4/2008 | Rajala et al. | 455/438 |
| 2008/0182580 A1* | 7/2008 | Laroia et al. | 455/440 |
| 2009/0042572 A1* | 2/2009 | Craig et al. | 455/436 |
| 2010/0069065 A1* | 3/2010 | Sambhwani et al. | 455/434 |
| 2010/0136977 A1* | 6/2010 | Gazzard | 455/436 |

FOREIGN PATENT DOCUMENTS

| | | |
|---|---|---|
| EP | 1 467 586 A2 | 10/2004 |
| EP | 1 626 600 A2 | 2/2006 |
| EP | 1 311 135 B1 | 10/2006 |
| WO | 00/41429 | 7/2000 |
| WO | 01/26248 A1 | 4/2001 |

OTHER PUBLICATIONS

International Search Report for International Application No. PCT/GB2007/050166; dated Jun. 29, 2007.

Craig, Stephen et al., U.S. Appl. No. 60/686,930, filed Jun. 3, 2005, 17 pages.

Office Action for European Application 07733589.1, dated Nov. 2, 2016, 6 pages.

R1-051109, QUALCOMM Europe, "Further description of WCDMA based E-UTRA"; 3GPP TSG-RAN WG1 #42bis, Oct. 10-14, 2005, San Diego.

\* cited by examiner

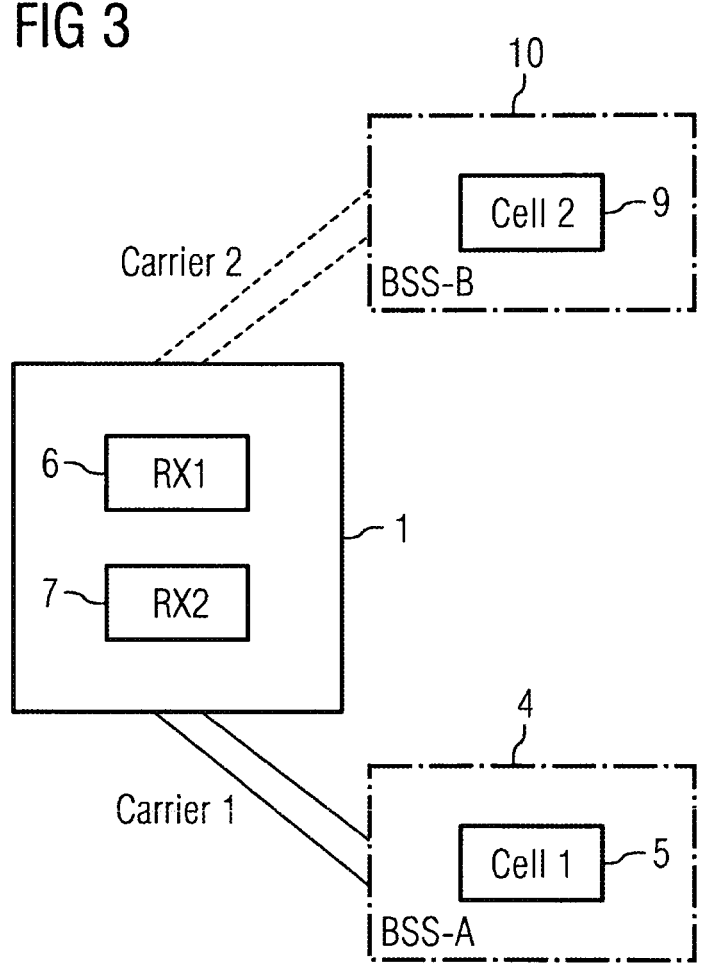

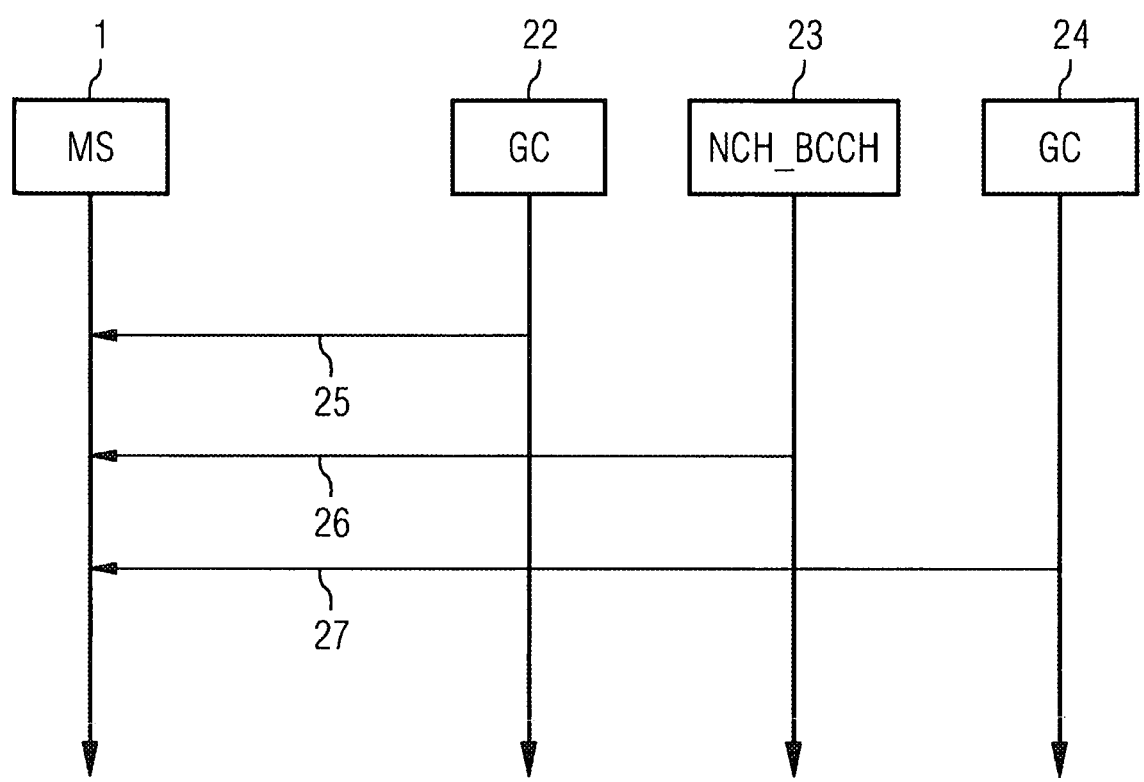

METHOD OF OPERATION IN A DUAL CARRIER COMMUNICATION SYSTEM

CROSS REFERENCE TO RELATED APPLICATIONS

This application is based on and hereby claims priority to Great Britain Application No. 0607359.7 filed on Apr. 12, 2006, the contents of which are hereby incorporated by reference.

BACKGROUND

Described below is a method of operation in a dual carrier communication system, in particular for global system for mobile communications (GSM) systems, such as general packet radio service (GPRS) or voice group call systems.

GSM Edge Radio Access Network (GERAN) currently operates on one carrier at a time, but to increase capacity on the downlink, dual carrier operation is being introduced. Typically, general packet radio service (GPRS) mobility, without the use of packet switched (PS) handover, is handled by a cell reselection procedure. In the cell reselection procedure, a mobile station (MS) detects that a neighboring cell has a stronger signal than that of its current cell and decides, either autonomously, or via network control, to reselect to the new cell. The MS drops its GPRS connection in the old cell, reads system information in the new cell, sends access bursts to request resources in the new cell, and finally performs a cell update to indicate to a serving GPRS support node (SGSN) in the network that the MS has moved to the new cell. Upon receiving the cell update, the SGSN redirects the downlink data flow to the MS.

During this time no downlink data is being received by the MS and only when the cell update takes place can uplink data be sent to the core network. It also assumes that the transfer will be successful, by dropping its existing connection at the start, although in some cases, the new cell may not have the resources available to allocate to the MS, requiring it to try to reconnect elsewhere. GPRS service interruption of up to 5 seconds may be experienced.

For voice group calls using voice group call service (VGCS) or voice broadcast service (VBS), a MS in group receive mode reads system information in a neighboring cell in order to determine the position of a notification channel (NCH) and obtain some cell specific parameters such as the cell's identity which is needed to derive the ciphering keys. After cell reselection, the MS reads the NCH, if present, to find a location and description of the group, or broadcast channel for the particular group, or broadcast call. During this time the MS may not be able to listen to the downlink of the group, or broadcast channel in the new cell. Thus, there may be a noticeable interruption to the reception of speech on cell change. Additionally, the MS may miss the downlink signalling messages that are sent on the group, or broadcast channel. These signalling messages can indicate the current status of the call (free or busy in VGCS only), the identity of the current talker (in VGCS only), new notifications (in both VGCS and VBS), or incoming short message service (SMS), either to the group or to the individual MS (applicable for both VGCS and VBS). Uplink BUSY messages are typically transmitted every 5 seconds, so for VGCS, the MS may have to wait some time to determine the current status of the uplink.

One proposal to speed up cell reselection for GPRS services has been to introduce a process of network assisted cell reselection, whereby the network can send the system information of the new cell to the MS whilst it is still in the old cell. This requires a radio access network (RAN) information management (RIM) implementation to automatically transfer system information from neighbor cells, or an operations and maintenance (O&M) application to configure neighbor cell information. Even with a network assisted cell change (NACC), there is still some extra service interruption time due to the MS accessing the new cell, being allocated resources, performing a cell update and waiting for downlink data to be received.

Another option is to use PS handover procedures as defined for Release-6 of 3GPP GERAN standards, whereby resources are reserved in the target cell and core network signalling is used to prepare the target before the MS is commanded to handover to the target cell. This has the best performance in terms of service interruption, but requires complex core network signalling and is wasteful of radio resources in the target cell, which are reserved, but not used for a period of time. PS handover is aimed at being used for real-time PS services where the revenue is worth the cost of the procedure.

For VGCS or VBS, there is no option but to simply accept a service interruption time.

SUMMARY

In accordance with a first aspect, a method of operation in a dual carrier communication system having a mobile device communicating with a network via first and second carriers; includes receiving data in the first cell via one of the first and second carriers on one carrier frequency, whilst receiving system information and/or downlink data from a second cell via the other of the first and second carriers on another carrier frequency.

The method makes use of the ability of a dual carrier mobile to receive data from two cells at the same time, so that ongoing data transfer continues in the first cell, whilst the new cell is being set up.

The mobile device may include a transmitter and first and second receivers.

Any implementation which enables reception on two different frequencies could be used.

The method may further include transferring resources for communicating between the mobile device and the first cell to use only one carrier, in order to free up the second receiver; and accessing the second cell from the mobile device using the other carrier.

If only one carrier is in use at the time, this transfer can be omitted.

The mobile device may access the second cell via the second carrier to carry out a cell reselection procedure, although there might be other situations where accessing more than one cell at one time is useful. One example of this is the use of dual carrier networks and mobile devices to receive the same MBMS (multi-media broadcast/multicast service) session from two cells at the same time in order to reduce the MBMS service interruption time on cell reselection.

The cell reselection procedure may include, after transferring resources from the second to the first carrier, continuing data exchange between the mobile device and the first cell on the first carrier; sending an uplink message to the second cell on the second carrier; switching downlink communication to the mobile via the second cell on the second carrier; and thereafter switching to uplink communication via the second cell on either carrier.

The second receiver may receive the system information to find the location of the notification channel and obtains some cell specific parameters; decodes the notification channel of the second cell to determine if a group call is on-going; and if a group call is ongoing, determines the location of the group call channel. Once the mobile device has started listening to the group channel in the second cell it may then stop listening to the group channel in the first cell.

This allows a user to move straight from one group call channel in one cell to the group call channel in a new cell, reducing the chances of service interruption to the listeners.

In accordance with a second aspect, a method of dual carrier mode cell reselection in a communication system having a mobile device and a network includes transferring resources for communication between the mobile device and the network via a first cell from two carriers to one carrier to free-up the other carrier; initiating a cell reselection procedure with the other carrier; accessing the network via a second cell; in the network, switching downlink data from the first cell to the second cell; and switching uplink data to the second cell.

In accordance with a third aspect, a method of dual carrier mode cell reselection in a voice group call service (VGCS) or voice broadcast service (VBS) communication system having a mobile device and a VGCS/VBS network includes the mobile device using one receiver to listen to a group channel in the first cell, whilst using a second receiver to obtain system information in a second cell.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 3 is a block diagram of a voice group call system carrying out method; and, FIG. 4 is a signal timing diagram illustrating a sequence of messages between a participating mobile device and a network supporting the voice group call.

DETAILED DESCRIPTION OF THE PREFERRED EMBODIMENT

Figure 1:
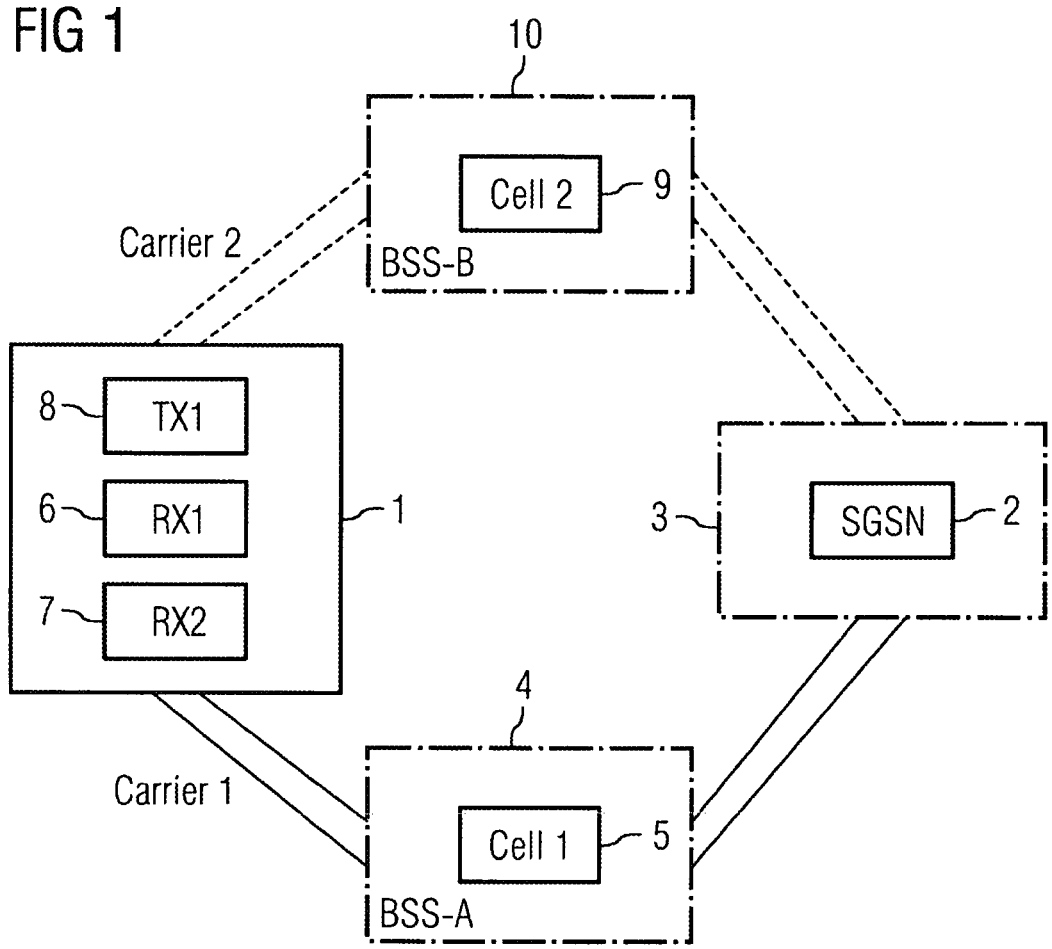
FIG. 1 is a block diagram of a system for carrying out the method.

Reference will now be made in detail to the preferred embodiments, examples of which are illustrated in the accompanying drawings, wherein like reference numerals refer to like elements throughout.

FIG. 1 illustrates a system operating in dual carrier mode, where cell reselection is required. A dual carrier mobile device (MS) 1, such as a laptop or mobile phone, communicates with an SGSN 2 of a mobile core network 3 via a base station (BSS-A) 4 of a first, or source, cell 5. A dual carrier mobile has two receivers 6, 7, so it is able to receive on both channels at once, although the device is only provided with a single transmitter 8. The dual receivers are used to enable the mobile to receive data from two different cells at the same time, enhancing the GPRS cell reselection procedure with little or no impact on the core network. In this example, when cell reselection is required, the mobile device chooses to move to a second, or target, cell 9 with a second base station (BSS-B) 10.

Figure 2:
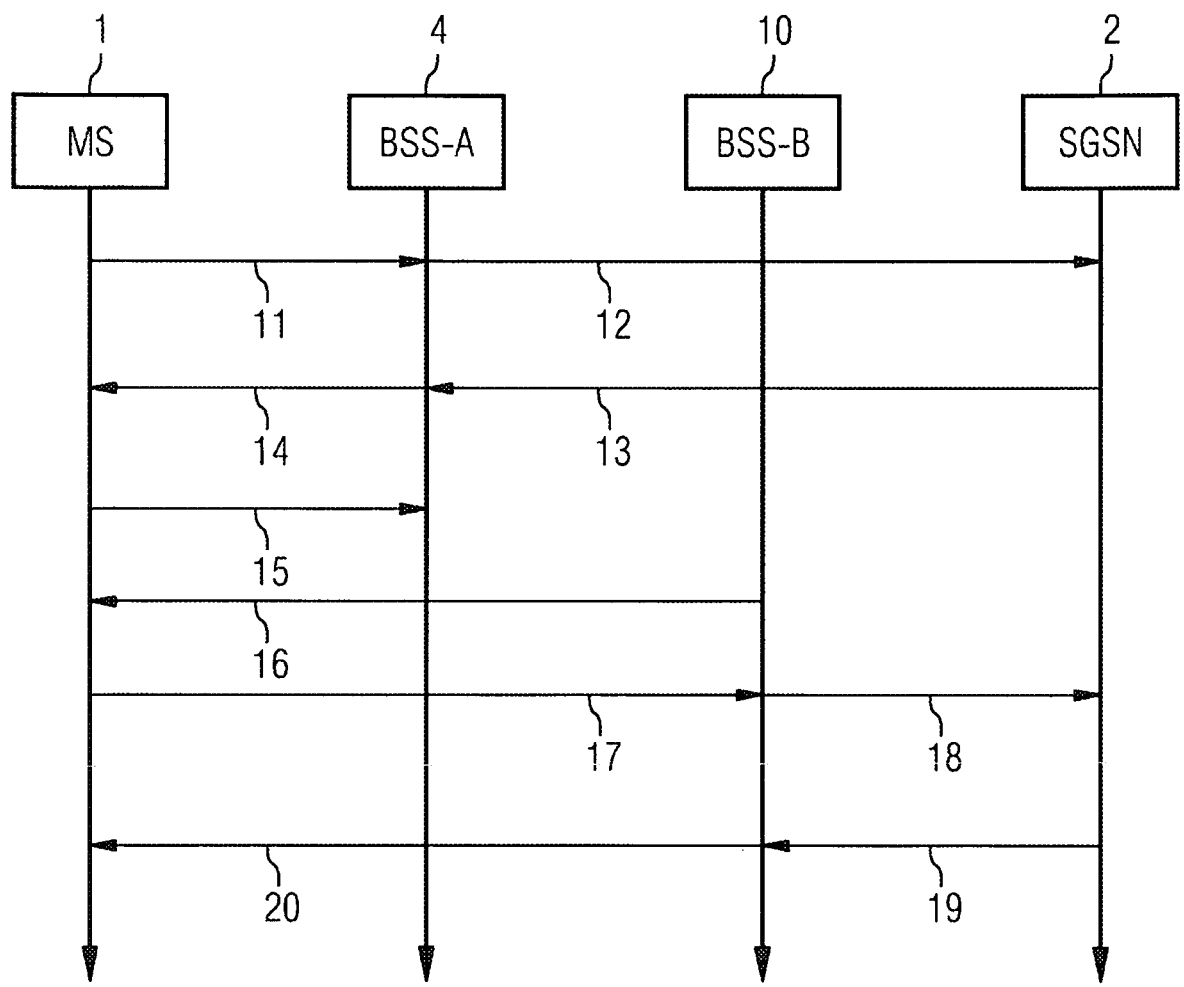
FIG. 2 is a signal timing diagram illustrating the sequence of messages between the mobile device and the network for operating according to the method in a GPRS system.

The sequence of message exchanges is illustrated in FIG. 2. The MS 1 is engaged in uplink (UL) 11, 12 and/or downlink (DL) 13, 14 data exchange with the SGSN 2 via BSS-A 4 and determines via legacy mechanisms that a cell reselection is required to a cell 9 parented via BSS-B 10. The MS either sends a new message 15, or a new information element in an existing message to BSS-A 4 to indicate that it would like to perform a dual carrier (DC) optimized cell reselection, or if network controlled cell reselection is being used, the network will initiate the procedure. BSS-A attempts to put all of the mobile's packet resources on to one carrier to free the mobile's second receiver up for receiving from the target cell parented by BSS-B. If this is not possible, then legacy procedures can be used for the cell reselection, or the network can choose to drop some of the data flows in order to free up the second receiver. In one embodiment, the BSS-A provides an acknowledgement to the mobile device, as to whether or not it can comply with the request to transfer resources.

After reading 16 system or packet system information (SI/PSI) in the target cell 9 via the second receiver 7 of MS 1, or by using NACC procedures having obtained this information via the source cell 5, the MS switches its transmitter 8 to make access in the target cell 9 and establish some UL packet resources in the target cell, using the transmitter 8 and one receiver 7, at the same time that it is receiving data on the other receiver 6 via the source cell 5. The MS may not be able to receive data in the source cell whilst the MS is transmitting in the target cell, but any lost data can be recovered, if needed, via the use of radio link control/medium access control (RLC/MAC) acknowledged mode when the transmitter is available again. In order to ensure that downlink resources are established on only one carrier an indication can be made to the network to this effect.

The MS sends 17, 18 a dummy UL logical link control (LLC) protocol data unit (PDU) to the SGSN 2 via resources in the target cell 9 as a cell update. The MS then switches its transmitter 8 back to the source cell for retransmissions and polling responses. Once the dummy UL LLC PDU has been sent, no further uplink data can be sent via the source cell 5, although retransmissions and polling responses can still be sent, if required. Upon receipt 18 of the UL LLC PDU at the SGSN 2, the SGSN switches DL LLC PDUs to flow via the target cell base station BSS-B 10. The SGSN 2 then sends 19, 20 either a real DL LLC PDU, or a dummy one if no real LLC PDU exists, to the MS 1 via BSS-B 10.

When either the current DL LLC PDU being received by the MS in the source cell 5 has been completely received and at least one DL RLC/MAC block has been received in the target cell, or at least one DL RLC/MAC data block addressed to the MS has been received in the target cell 9, then the MS tunes its transmitter 8 to the target cell and starts sending UL LLC PDUs via the target cell and BSS-B 10 and drops radio resources in the source cell 5. Alternative termination criteria could be set if desired. The MS can ask BSS-B for more resources if required, which are allocated on 2 carriers in the downlink if necessary.

Thus, GPRS users benefit from a virtually seamless PS service in the downlink with low PS service interruption in the uplink for cell reselection, without needing RIM or O&M configuration for the operator, as in the case of network assisted cell change, nor is there unnecessary resource reservation in the target cell whilst waiting for the MS to access the target cell as in PS Handover. Although, the MS has had to wait before it can send uplink data via the new cell, there is no downlink delay because that continues in the old cell until the new connection is ready.

Another example is with respect to voice group (or broadcast) calls. Currently, a voice group call may include users operating through several different cells and whilst the call is ongoing, one of the listeners using receiver 6 in cell 5 that is parented by BSS 4 may need to carry out cell reselection, as described above. Typically, the listener needs to obtain system information messages from the broadcast control channel (BCCH) of the target cell that is parented by the target BSS in order to determine the position of the notification channel and determine some cell specific parameters. The MS then must read the messages on the notification channel (NCH), once in the target cell, to determine the location of the group, or broadcast channel for that call. In the meantime, the user is unable to receive the data on the group channel.

Therefore, for VGCS/VBS, using a dual carrier VGCS/VBS listening MS, the MS reads the system information on the BCCH and the messages on the NCH of the target cell using the second receiver whilst still in the source cell and listening to the group call using the first receiver in the source cell to receive data from the group channel. With this information from the target cell, the VGCS/VBS MS can move straight to the group channel in the new cell, provided that this group call is actually active at the time of the move. The amount of time that is saved is related to how long it takes the MS to read the NCH in the new cell. The advantages are that there is a reduced service interruption to listeners in group receive mode and that there is less likelihood of missing important signalling and SMS messages, such as a notification of change of talker.

FIGS. 3 and 4 illustrate an example of VGCS/VBS. The MS 1 receives data 25 on a group channel 23 in a first cell 5 parented by BSS-A 4 at a first receiver 6 using a first carrier. The MS also reads using a second receiver 7 and second carrier, the system information on the BCCH and messages on the NCH of a second cell 9 parented by BSS-B 10. Data is received 25 from a group channel 22 by first receiver 6 in the first cell 5, and system information on the BCCH 23 and messages on the NCH 23 from the second cell 9 are both received in messages 26 at the second receiver whilst the MS is still receiving the data in the first cell 5. The MS is then able to receive 27 data from the group channel 24 of the second cell as soon as it moves to the second cell.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method, comprising:
 performing a cell reselection in a voice group call service, VGCS, communication system comprising a mobile device and a VGCS network;
 using, by the mobile device, a receiver to listen to a group channel of the VGCS network in a first cell;
 reading, by the mobile device, a message on a notification channel, NCH, and obtaining system information of the VGCS network in a second cell, wherein the mobile device decodes the NCH of the second cell to determine if a group call is ongoing; and
 determining a location of the group channel in the second cell based on the received message in order to determine the location of the group call in the second cell; and
 wherein the group call is active at the time of moving from the first cell to the second cell.

2. The method according to claim 1, further comprising:
 performing communication of the mobile device with the VGCS network via first and second carriers, wherein the mobile device includes a transmitter and a first and a second receivers.

3. The method according to claim 2, further comprising:
 transferring resources for communication between the mobile device and the first cell to use only one carrier, thereby freeing up the second receiver, and accessing the second cell from the mobile device using the second carrier.

4. The method according to claim 3, continuing the communication in the first cell via one of the first and the second carriers on one carrier frequency, while simultaneously receiving the system information and downlink data from the second cell via the other of the first and second carriers on another carrier frequency, where the communication with the first cell is continued until a connection is established via the second cell.

5. The method according to claim 1, wherein the mobile device reads the system information of the VGCS network on a broadcast control channel, BCCH, in the second cell.

6. The method according to claim 2, wherein the mobile device uses the first cell to listen to a group call of the VGCS network.

7. A method, comprising:
 performing a cell reselection in a voice broadcast service, VBS, communication system comprising a mobile device and a VBS network;
 using, by the mobile device, a first receiver to listen to a group channel of the VBS network in a first cell;
 reading, by the mobile device, a message on a notification channel, NCH, and obtaining system information of the VBS network in a second cell, wherein the mobile device decodes the NCH of the second cell to determine if a group call is ongoing;
 determining a location of the group channel in the second cell based on the received message in order to determine the location of the group call; and
 wherein the group call is active at the time of moving from the first cell to the second cell.

8. A mobile device configured to:
 perform a cell reselection in a voice group call service, VGCS, communication system comprising the mobile device and a VGCS network;
 wherein the mobile device further comprises:
 a first receiver, configured to:
 listen to a group channel of the VGCS network in a first cell; and
 wherein the mobile device is further configured to:
 read a message on a notification channel, NCH, and obtain system information of the VGCS network in a second cell, wherein the mobile device decodes the NCH of the second cell to determine if a group call is ongoing; and determine a location of the group channel in the second cell based on the received message in order to determine the location of the group call; and wherein the group call is active at the time of moving from the first cell to the second cell.

9. A mobile device configured to:

perform a cell reselection in a voice broadcast service, VBS, communication system comprising the mobile device and a VBS network;

wherein the mobile device further comprises:

a first receiver, configured to:

listen to a group channel of the VBS network in the first cell; and wherein the mobile device is further configured to:

read a message on a notification channel, NCH, and obtain system information of the VBS network in the second cell, wherein the mobile device decodes the NCH of the second cell to determine if a group call is ongoing; and determine a location of the group channel in the second cell based on the received message in order to determine the location of the group call; and wherein the group call is active at the time of moving from the first cell to the second cell.

* * * * *